(12) United States Patent
Aebischer et al.

(10) Patent No.: US 6,409,269 B1
(45) Date of Patent: Jun. 25, 2002

(54) VEHICLE SEAT ASSEMBLY WITH THERMOFORMED FIBROUS SUSPENSION PANEL

(75) Inventors: Silvio Aebischer, Grand Rapids; Thomas J. Dellinger; Eric Burmeister, both of Zeeland; Neil J. Bush, Pinckney, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/705,144

(22) Filed: Nov. 2, 2000

Related U.S. Application Data

(62) Division of application No. 09/076,544, filed on May 12, 1998, now Pat. No. 6,213,557.

(51) Int. Cl.[7] .................................................. B60N 2/50
(52) U.S. Cl. ........................... 297/452.55; 297/452.56; 297/DIG. 2
(58) Field of Search ....................... 297/452.31, 452.55, 297/452.56, DIG. 2

(56) References Cited

U.S. PATENT DOCUMENTS

| | | | |
|---|---|---|---|
| 3,182,377 A | * | 5/1965 | Hoven et al. ........ 297/452.55 X |
| 3,521,929 A | | 7/1970 | Pearson |
| 3,797,887 A | * | 3/1974 | Barecki et al. ...... 297/452.55 X |
| 4,073,539 A | | 2/1978 | Caruso |
| 4,077,665 A | | 3/1978 | Storch ............... 297/DIG. 2 X |
| 4,502,731 A | | 3/1985 | Snider |
| 5,037,690 A | | 8/1991 | Van Der Kooy ............ 428/116 |
| 5,040,848 A | | 8/1991 | Irie et al. ................ 297/452.31 |
| 5,076,646 A | | 12/1991 | Matte |
| 5,085,488 A | | 2/1992 | Dal Monte |
| 5,101,811 A | | 4/1992 | Brunswick .............. 297/112 X |
| 5,340,642 A | | 8/1994 | Baumgartl et al. ......... 428/224 |
| 5,369,173 A | | 11/1994 | Furuta ..................... 428/36.92 |
| 5,462,339 A | | 10/1995 | Schmale et al. ....... 297/452.55 |
| 5,464,273 A | | 11/1995 | Makoto ................. 297/452.55 |
| 5,503,454 A | | 4/1996 | Sakamoto |
| 5,522,645 A | | 6/1996 | Dahlbacka |
| 5,611,598 A | | 3/1997 | Knoblock |
| 5,775,779 A | | 7/1998 | Abu-Isa et al. ........ 297/452.56 |
| 5,824,410 A | * | 10/1998 | Sakai et al. ................. 428/361 |

FOREIGN PATENT DOCUMENTS

| | | | |
|---|---|---|---|
| DE | 4401665 | 7/1985 | |
| DE | 3524396 | 1/1987 | |
| DE | 29718241 | 1/1998 | |
| EP | 0276769 | 8/1988 | |
| FR | 2135441 | 12/1972 | ............ 297/DIG. 2 |
| FR | 2445244 | 7/1980 | |

* cited by examiner

*Primary Examiner*—Peter R. Brown
(74) *Attorney, Agent, or Firm*—Foley & Lardner

(57) ABSTRACT

A vehicle seat assembly having a suspension panel for the seat pad that is formed of resin impregnated compressed fibrous bat. The suspension panel is formed with corrugations and other contours to enable the suspension panel to flex in a predetermined manner to provide suspension to a seat pad. The suspension panel, when used in the seat back can also form the rear trim panel of the seat back thus reducing the number of components in the seat back as the suspension panel serves multiple functions. The fibrous panel can be reclaimed after the useful life of the seat and manufactured into a new panel thereby reducing the quantity of seat components that are scrapped after use. In addition, recycled fibers can be used originally thereby increasing the amount of recycled content in the seat assembly.

10 Claims, 2 Drawing Sheets

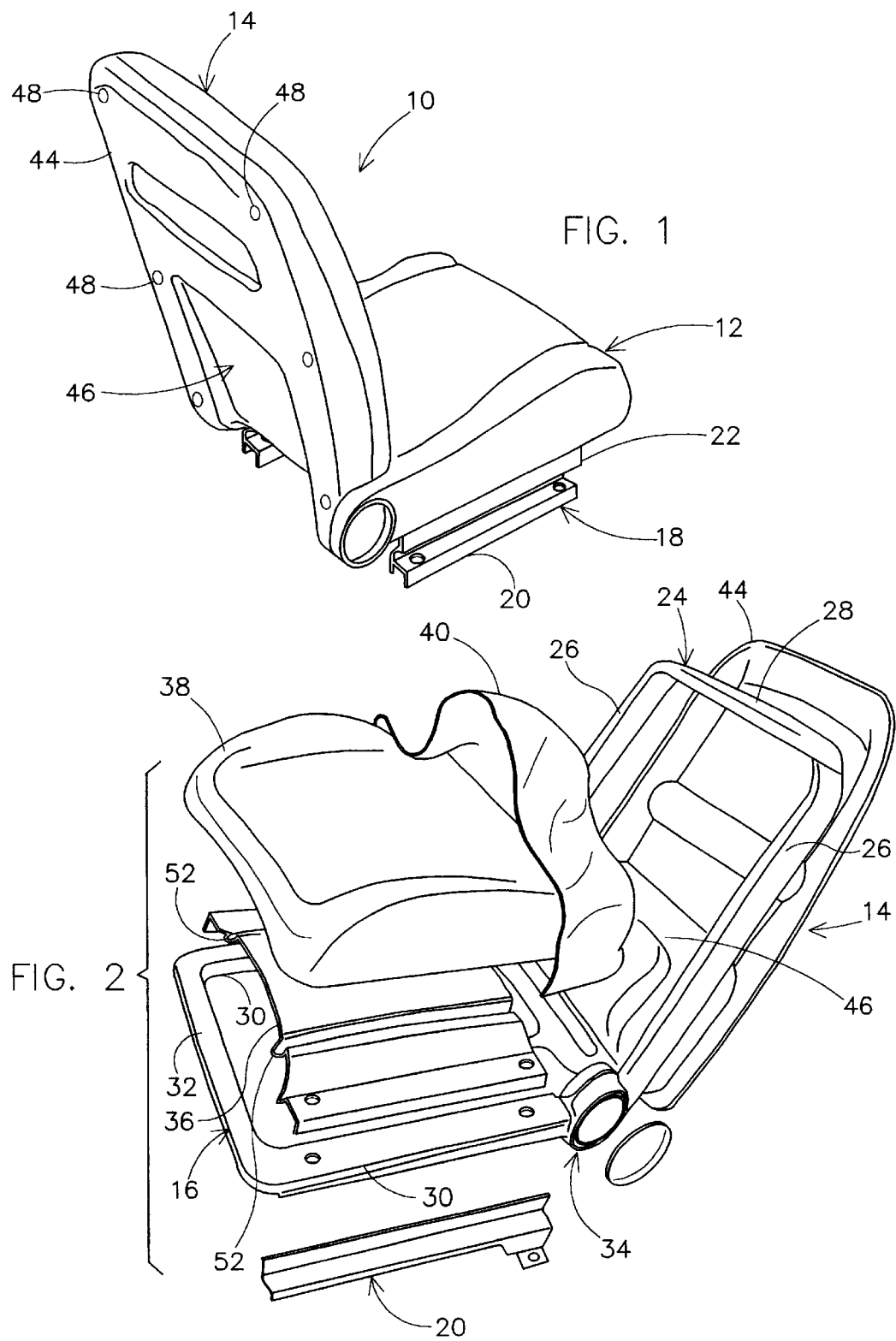

VEHICLE SEAT ASSEMBLY WITH THERMOFORMED FIBROUS SUSPENSION PANEL

This is a division of U.S. patent application Ser. No. 09/076,544, filed May 12, 1998 now U.S. Pat. No. 6,213,557

BACKGROUND AND SUMMARY OF THE INVENTION

The present invention relates to a vehicle seat assembly and in particular to one having a thermoformed suspension panel made of a resin or thermoplastic impregnated compressed fibrous bat to provide suspension for the seat pad and in some cases, an external shell or rear trim cover for the seat back.

Efforts are being made in the automotive industry to reduce the negative environmental impact of motor vehicles. One way doing this is to increase the amount of recycled materials that go into a new automobile. Another way is to recycle components from a motor vehicle at the end of a vehicle's useful life. A third way of reducing the negative environmental impact of a vehicle is to reduce the number of individual components in a vehicle by designing components that perform multiple functions instead of just one function. This can reduce the quantity of raw material used in a vehicle as well as reduce the time and energy required to produce the vehicle.

By recycling the seat components, several different processes are contemplated. The most preferred process is to reuse a seat component without any alteration from its original form. The next level is to reclaim a component and manufacture it into another useful component. This has been done regularly with most metals in which the reclaimed parts are melted down and remade into a new component. The next level is to shred the components, such as the foam pad, into small pieces that can be used in another product such as rebonded carpet padding. This is less desirable in that the carpet padding, after its useful life, is not reused and is land filled. Fourth, and least preferred, is shredding of the seat components followed by land filling of the shredded materials.

The seat assembly of the present invention facilitates the recycling of the vehicle seat assembly by providing a suspension panel for supporting the seat pad that can be made of a recycled material and which can be reclaimed and manufactured into a new component after the useful life of the seat assembly. When the suspension panel is also used as the rear trim cover of a seat back, multi-tasking is involved, using a single component for both the suspension as well as the rear trim panel. This serves to reduce the number of components in a seat assembly.

The suspension panel of the present invention is manufactured of a resin or thermoplastic impregnated compressed fibrous bat material. Plastic fibers are preferred, such polyethelyne terephthalate (PET) from recycled beverage containers, virgin PET fibers or post industrial polypropylene. Alternatively, offal from various manufacturing processes can be used, such as offal from vehicle head liner manufacturing. Other fibers can be used as well. Plastic fibers are preferred over natural fibers such as cotton or wood pulp due to their resistance to absorption of water. However, cotton fibers and other natural fibers can be used in the suspension panel.

The panels are formed with corrugations and other contours that provide for differing degrees of flexibility in the panel at different locations. With each particular seat design, the suspension panel can be individually designed to provide specific deflection characteristics. The deflection characteristics will be designed in conjunction with the seat pad to provide a desired comfort.

The suspension panel can be thermoformed and bonded to a covering fabric during the thermoforming process to provide a decorative exterior surface to the suspension panel. This is particularly useful when the panel also serves as a seat shell forming exterior surface of the seat back. A fabric surface matching that of the seat trim cover overlying the seat pad can be bonded directly to the suspension panel.

Further objects, features and advantages of the invention will become apparent from a consideration of the following description and the appended claims when taken in connection with the accompanying drawings.

BRIEF DESCRIPTION OF THE DRAWINGS

FIG. 1 is a rear perspective view of the vehicle seat of the present invention having a formed suspension panel and rear trim panel;

FIG. 2 is an exploded, perspective view of the seat assembly of the present invention;

DETAILED DESCRIPTION OF THE PREFERRED EMBODIMENT

Figure 3:
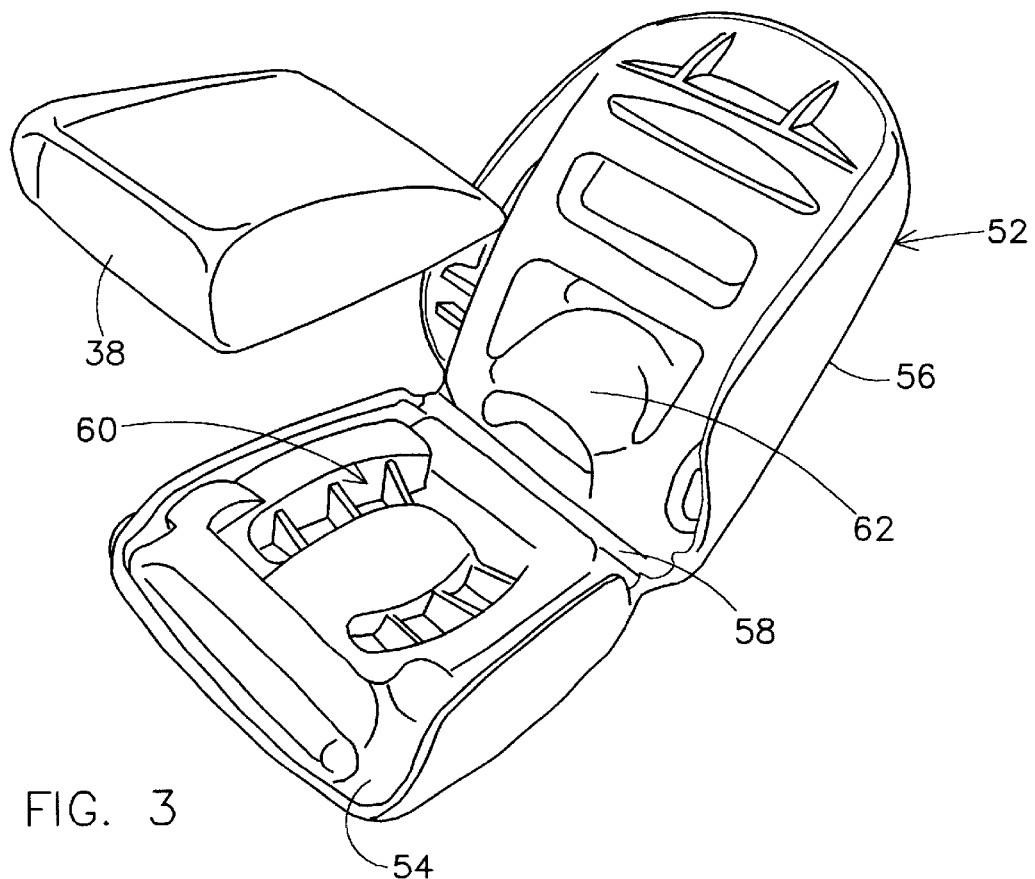
FIG. 3 is a perspective view of an alternative embodiment of the formed suspension panel.

A vehicle seat assembly of the present invention having a formed suspension panel is shown in FIG. 1 and designated generally at 10. The seat assembly 10 includes a lower generally horizontal seat bottom 12 and a generally upright seat back extending upwardly at the rear end of the seat bottom 12. The seat bottom 12 includes a frame 16 (FIG. 2) which is mounted to a slide track 18. The slide track 18 includes a fixed rail 20 adapted to be mounted to a motor vehicle body and a slide rail 22 which moves fore and aft upon the fixed rail 20 for adjustment of the fore and aft position of the seat assembly within the motor vehicle.

With reference to FIGS. 1 and 2, the seat back includes a back frame 24 which, as shown in FIG. 2, has upright frame side members 26 on each side of the seat and an upper frame cross member 28 at the upper end of the seat back. The seat bottom frame 16 is similarly constructed with frame side members 30 extending along each side of the seat and a front frame cross member 32. The seat bottom frame and seat back frame are joined together through a recliner mechanism shown schematically at 34. The invention does not require any particular frame structure for the seat bottom and seat back. Those shown are merely exemplary of many possible frame configurations.

The seat bottom includes formed suspension panel 36 which is attached to the frame 16. The suspension panel 36 supports a resilient seat pad 38. A trim cover 40 covers the pad 38 and is shown in this embodiment wrapping around the frame 16 and attached to the bottom side of the frame by any one of a variety of known attachments.

The seat back is similarly constructed with a trim cover 42, a resilient pad (not shown) and a suspension panel 44. The suspension panel 44 of the seat back is attached to the back frame 24 and provides support to the resilient pad of the seat back. The panel 44 is formed with a forwardly projecting lower portion 46 in the lumbar region of the seat back to provide additional support to the pad in the lumber region of the seat back. As shown in FIG. 1, the forwardly projecting lower end portion 46 of the back panel results in a corresponding recess at the lower end of the back panel when viewed from behind the seat assembly. This provides increased knee room for a person seated behind the seat assembly 10. Other raised or forwardly extending portions of the panel can be provided to provide different degrees of support to the pad at various locations within the seat back. For example, the panel can be raised along the side edges of the seat back to increase support in the bolster region of the seat back.

The panel 44 is attached to the frame with any of a variety of means including the fasteners 48 shown on the back of the seat assembly in FIG. 1. The fasteners 48 can be threaded fasteners, snap fasteners, etc. In addition, the panel 44 can be made with integral projections which insert into apertures in the seat back frame if desired. The seat back suspension panel 44 provides suspension and support to the seat pad as well as forming a back trim panel for the seat back. This reduces the number of components in the seat assembly. No longer is a separate spring wire suspension needed in the seat back. Instead, the suspension panel 44 serves both the suspension function as well as the decorative trim for the rear surface of the seat back.

In case of the seat bottom, the panel 36 provides the suspension support to the seat pad 38. The panel 36 is formed with different grooves or corrugations 50 to provide different degrees of support and flexibility to the panel 36. Alternative embodiments are shown in FIGS. 3 and 4 where the seat bottom suspension panel is shown with the different configurations to provide different degrees of flexibility and suspension support to the seat pad.

The degree of flexibility in the panel is designed in conjunction with the size, shape, thickness, density etc. of the resilient seat pad to achieve a desired degree of cushioning and comfort for a seat occupant. A variety of configurations can be used as illustrated in FIGS. 2, 3 and 4.

Figure 4:
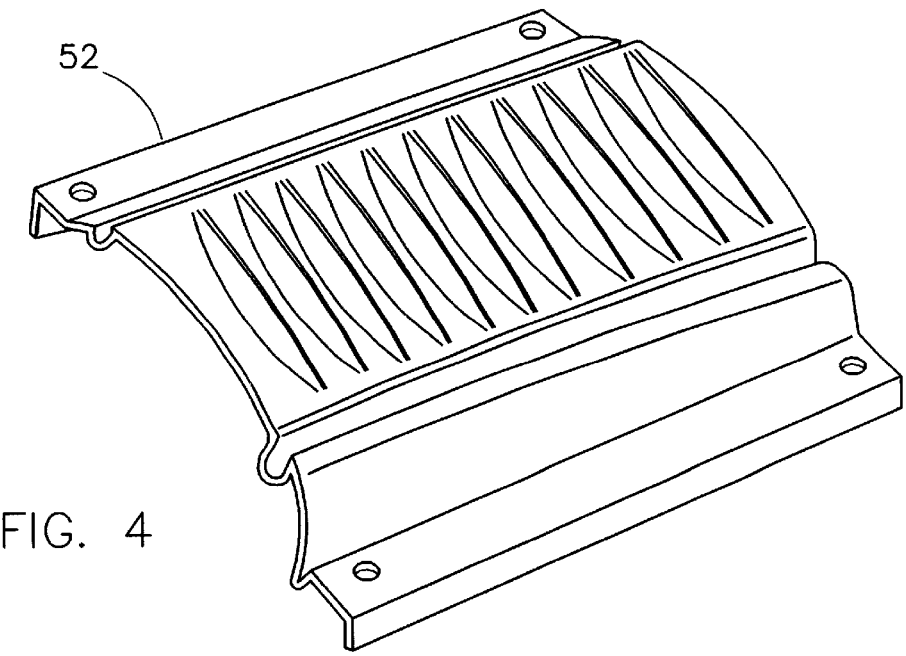
FIG. 4 is a perspective view of an another embodiment of the formed suspension panel with a plurality of corrugations in the center of the panel.

With reference to FIG. 3, an alternative embodiment of the seat suspension panel of the present invention is shown. A suspension panel 52 is shown which is a single piece formed panel having a seat bottom portion 54 and seat back portion 56. The two portions are joined together by a living hinge region 58, allowing the bottom and back portions to flex relative to one another as the seat back is reclined to various positions. The seat bottom portion is configured with a generally U-shaped recessed portion 60 which corresponds to the buttock region of the seat occupant to provide a greater degree of flexibility in this region of the panel as compared to other regions of the panel for improved comfort. The seat back again has a forwardly projecting lower end portion 62 to provide increased lumbar support.

The suspension panel is made of a fibrous bat impregnated with a binder resin or thermoplastic fibers. The fibers are preferably non-woven and are randomly oriented. The fibers are needled to cause them to intermesh and then to orient them generally transversely to the planes of the surfaces of the bat. The fibers used in the bat are preferably thermoformable. It is desirable that they take a set when placed in a heated mold in the case of the thermoset resin or in a cold mold with thermoplastic so that they hold a three-dimensional configuration. Thermoplastic fibers are preferred, though their melting point should be substantially greater than the temperatures to which the end product may be exposed in intended use. Non-woven polyester fiber is a particularly preferred material in forming the non-woven fibrous bat because of its excellent elongation and molding characteristics at molding temperatures. Other fibers which could be employed include nylon, polypropylene and polyethylene such as polyethylene terephthalate (PET).

The binder resin that impregnates the bat adheres the fibers to one another. The binder resin must be thermoformable to accommodate the molding process. This requires a thermoplastic or equivalent material. A binder resin may be selected from the group including: water dispersed urethane, acrylic, ethylene vinyl acetate acrylic, styrene butadiene rubber, polyvinyl acetate, polyvinyl acrylic copolymer, epoxy and water-based styrene.

The impregnating binder resin of the bat can also be a thermoset resin which provides an advantage that once it is cured, it will have very high resistance to heat distortion or deterioration. The thermoset resin is preferably elastomeric in nature so that the suspension panel has elastic characteristics. A preferred thermosetting elastomeric resin is elastomeric urethane.

An alternative material for the suspension panel, other than a resin impregnated fibrous bat, is a blend of organic fibrous materials known as a kenaf, which is the ground up stalk fibers of the hibiscus plant. These fibers are blended with polypropylene in a mixture that can range from about 40% kenaf to 60% polypropylene fibers by weight to a mixture of about 60% kenef and 40% polypropylene fibers. The polypropylene is in a fibrous form and the kenef and polypropylene fibers are mixed in a conventional pin cylinder mixer and subsequently oriented and formed into a web using a conventional airlay machine to initially orient the fibers longitudinally and subsequently, by a standard needling machine to entangle the fibers. The result is a web of somewhat fluffy mat-material which is then heated to melt the polypropylene fibers. The heated mat is placed into a cold tool, compressed and formed into the desired shape. Instead of kenef fibers, other plastic fibers can be used that have a melting point higher than the polypropylene fibers.

During the forming process of the suspension panel, a decorative cover sheet can be applied to the panel prior to the thermoforming of the panel. For example, a decorative fabric can be applied to the rear surface of the panel used in the seat back to provide an attractive appearance to the rear of the seat back. Preferably, the fiber of the decorative cover would also be thermoformable so that the cover can be applied to the uncured resin of the bat prior to thermoforming. The resin, once cured, serves as the adhesive to bond the decorative cover in place on the suspension panel. A particular preferred thermoformable polymeric fabric cover sheet comprises a nylon or polyester warp knit cloth material.

It is to be understood that the invention is not limited to the exact construction illustrated and described above, but that various changes and modifications may be made without departing from the spirit and scope of the invention as defined in the following claims.

We claim:

1. A vehicle seat assembly comprising:
    a generally horizontal seat bottom;
    a seat back extending generally upwardly at a rear end of the seat bottom;
    the seat back having a frame with spaced apart frame members coupled to a cross member;
    a suspension panel having at least one corrugation to provide differing degrees of flexibility at different locations on the suspension panel and a forwardly projecting lower portion in a lumbar region and a corresponding recess on a rear side of the suspension panel providing increased space for an occupant seated behind the seat assembly, the suspension panel mounted to the spaced apart frame members and spanning across the seat between the frame members;

a seat pad carried by the suspension panel such that the suspension panel transmits seating loads from the seat pad to the frame; and the suspension panel being a thermally molded compressed fibrous bat impregnated with a thermoplastic resin, and the fibrous bat is non-woven randomly oriented fibers selected from the group consisting of thermoformable plastic fibers and natural fibers thereby increasing recycleability of the suspension panel.

2. The vehicle seat assembly of claim 1 wherein the fibers of the bat are thermoplastic fibers.

3. The vehicle seat assembly of claim 1 wherein the fibers of the bat include fibers selected from the group of polyester, nylon, polypropylene and polyethylene.

4. The vehicle seat assembly of claim 1 wherein the natural fibers are selected from the group consisting of kenaf, cotton, and wood pulp.

5. The vehicle seat assembly of claim 1 wherein the fibers of the bat are needled.

6. The vehicle seat assembly of claim 1 wherein the suspension panel has a decorative skin bonded to one surface thereof.

7. The vehicle seat assembly of claim 1 wherein the suspension panel has varying contours to produce varying degrees of flexibility at different locations of the panel.

8. A vehicle seat assembly comprising:

a generally horizontal seat bottom;

a seat back extending generally upwardly at a rear end of the seat bottom;

the seat back having a frame with two spaced apart frame members coupled to a cross member, the spaced apart frame members and cross member defining a seat back frame front and rear face;

the seat back further having a rear trim panel that includes at least one corrugation to provide differing degrees of flexibility at different locations on the rear trim panel and a forwardly projecting lower portion in a lumbar region and a corresponding recess on a rear side of the rear trim panel providing increased space for an occupant seated behind the seat assembly, where the rear trim panel covers the rear face of the seat back frame, the rear trim panel being formed of a resin impregnated compressed fibrous bat, wherein the bat includes thermoformable materials;

the rear trim panel mounted to and supported by the two spaced apart frame members; and a portion of the rear trim panel extending between the spaced apart frame members and carrying a seat back pad that covers a front face of the trim panel portion and the front face of the frame, the rear trim panel thereby forming a suspension panel operable to transmit seating loads from the seat back pad to the frame.

9. The vehicle seat assembly of claim 8 wherein the portion of the rear trim panel has a forwardly projecting lower end portion to provide increased support to the seat back pad in the lumbar region of a seat occupant.

10. The vehicle seat assembly of claim 8 wherein the rear trim panel has a decorative cover layer laminated to its rear face.

* * * * *